United States Patent
Hughes et al.

(10) Patent No.: US 9,435,370 B2
(45) Date of Patent: Sep. 6, 2016

(54) LOCKING FASTENER

(71) Applicant: MacLean-Fogg Company, Mundelein, IL (US)

(72) Inventors: Mark W. Hughes, Fulton, IL (US); Nicholas P. Tobias, Galena, IL (US)

(73) Assignee: MacLean-Fogg Company, Mundelein, IL (US)

( * ) Notice: Subject to any disclaimer, the term of this patent is extended or adjusted under 35 U.S.C. 154(b) by 38 days.

(21) Appl. No.: 14/518,359

(22) Filed: Oct. 20, 2014

(65) Prior Publication Data

US 2015/0110573 A1   Apr. 23, 2015

Related U.S. Application Data

(60) Provisional application No. 61/893,442, filed on Oct. 21, 2013.

(51) Int. Cl.
*F16B 39/30* (2006.01)
*F16B 39/32* (2006.01)
*F16C 35/063* (2006.01)

(52) U.S. Cl.
CPC .............. *F16B 39/32* (2013.01); *F16C 35/063* (2013.01); *F16C 2326/02* (2013.01)

(58) Field of Classification Search
CPC ........ F16B 39/04; F16B 39/30; F16B 39/34; F16B 39/282
USPC .......................................... 411/204, 205, 211
See application file for complete search history.

(56) References Cited

U.S. PATENT DOCUMENTS

| | | | |
|---|---|---|---|
| 292,513 A | 1/1884 | Shailler | |
| 588,346 A | 8/1897 | Mireault | |
| 1,212,033 A | 1/1917 | Eneign et al. | |
| 1,287,270 A | 12/1918 | Ensign | |
| 1,297,845 A | 3/1919 | Hawrylasz | |
| 3,762,455 A | 10/1973 | Anderson, Jr. | |
| 3,844,323 A | 10/1974 | Anderson, Jr. | |
| 3,942,570 A | 3/1976 | Bochman et al. | |
| 4,812,094 A | 3/1989 | Grube | |
| 4,971,501 A | 11/1990 | Chavez | |
| 5,180,265 A | 1/1993 | Wiese | |
| 5,221,168 A * | 6/1993 | Kasai | F16C 35/063 411/124 |
| 5,533,849 A * | 7/1996 | Burdick | F16C 25/06 411/120 |
| 5,597,278 A | 1/1997 | Peterkort | |
| 5,618,143 A * | 4/1997 | Cronin, II | B25B 13/48 411/120 |
| 5,967,721 A * | 10/1999 | Giachinta | F16B 39/282 411/120 |
| 6,290,442 B1 | 9/2001 | Peterkort | |
| 7,029,218 B2 | 4/2006 | Peterkort | |
| 7,625,164 B2 * | 12/2009 | Rode | F16B 39/32 411/190 |
| 7,927,052 B1 * | 4/2011 | Varden | F16B 39/108 411/197 |
| 8,011,866 B2 | 9/2011 | Harris | |
| 8,016,531 B2 * | 9/2011 | White | F16B 39/10 301/105.1 |
| 8,403,611 B2 * | 3/2013 | Friesen | F16B 39/26 411/191 |
| 8,459,919 B2 | 6/2013 | Ehrler et al. | |
| 8,540,470 B2 | 9/2013 | Dillon et al. | |
| 9,217,461 B2 * | 12/2015 | Rode | F16B 39/32 |
| 2004/0096289 A1 * | 5/2004 | Bydalek | F16B 37/14 411/161 |

* cited by examiner

*Primary Examiner* — Roberta Delisle
(74) *Attorney, Agent, or Firm* — Brinks Gilson & Lione (57) ABSTRACT

A locking fastener is provided that may be automatically unlocked and locked by sliding a wrench onto the nut and removing the wrench. The fastener includes a biased arm extending outward from a wrench bearing surface that presses against a pawl. The pawl includes ratchet teeth that engage ratchet teeth of a retainer to lock the fastener. The fastener is unlocked by compressing the arm with a wrench.

22 Claims, 8 Drawing Sheets

LOCKING FASTENER

This application claims the benefit under 35 U.S.C. §119 (e) of U.S. Provisional Application No. 61/893,442, filed Oct. 21, 2013, which is hereby incorporated by reference herein.

BACKGROUND

The present invention relates generally to internally threaded nuts and more particularly to a nut that locks to prevent the nut from loosening.

Nuts are known as a versatile component for fastening many different types of parts together. Fundamentally, a nut typically includes inner threads that are designed to engage corresponding external threads on a shaft. The nut further includes wrench bearing surfaces for rotating the nut with a tool. Accordingly, by rotating the nut, or by rotating the shaft and preventing the nut from rotating, the nut can be tightened or loosened on the shaft. Nuts are also typically provided with a pressure surface to apply longitudinal force to an apparatus.

One problem with conventional nuts is that they may inadvertently loosen during use. This commonly occurs when the apparatus that the nut is attached to experiences vibrations during use of the apparatus. Vibrations occur for numerous reasons and usually cannot be controlled by the designer, manufacturer or operator of an apparatus. For example, vibrations can be caused by internal forces necessary for the apparatus to function, such as an internal combustion engine or electric motor, or can be caused by external forces during use of the apparatus, such as a vehicle bouncing up and down as it travels over a road. Vibrations can cause a nut to spontaneously loosen by causing fluctuations in the tension of the threaded engagement between the nut and the shaft. Because a nut requires more torque to tighten it than to loosen it, the nut seeks a lower tension state by spontaneously loosening when there is sufficient vibration to allow the nut to overcome whatever resistance there may be to loosening.

Various systems have been designed to prevent nuts from loosening after being initially tightened. A common way to address this problem is to increase the friction that the nut must overcome before loosening. One of the simplest approaches to increase friction is to provide the nut with a large pressure face that contacts the apparatus and applies longitudinal force to the apparatus. By increasing the size of the pressure face, the friction between the nut and the apparatus increases, and because the nut must overcome this friction to loosen, the nut is more resistant to loosening. Friction can be increased even further by providing protrusions on the pressure face that dig into the apparatus when the nut is tightened. Another way to reduce loosening of nuts is to add an expandable washer between the pressure face of the nut and the apparatus. Expandable washers absorb some of the fluctuations in tension of the fastener engagement so that the tension on the nut is more uniform. Thus, the nut is somewhat isolated from the vibrations and does not experience the full fluctuations in tension that it normally would experience. Another way to reduce loosening of nuts is to apply an adhesive or other material between the threads of a nut and the shaft. Depending on the type of material used, the result can be to essentially glue the nut and the shaft together to prevent relative movement or to increase the friction that the nut must overcome to loosen.

One problem with many solutions to nut loosening is that the nut can still loosen if enough vibrations occur to overcome the increased resistance to loosening. In other words, many approaches rely on increasing the resistance to loosening but do not provide a positive locking feature. Another problem with many solutions is that they also increase the amount of torque required to tighten the nut. This is a particular problem in applications where a precise amount of torque is required on the fastener to achieve a specified longitudinal force on the apparatus. Many solutions are not desirable in this type of application because the increased torque caused by a washer, adhesive or other friction enhancement feature is unpredictable and makes it difficult to achieve the precise longitudinal force that is required.

One particularly demanding application for nuts is axle nuts that attach the wheel hub of a vehicle to the axle. Foremost, axle nuts are a critical safety component in a vehicle because if an axle nut loosens, the wheel hub will first begin to wobble erratically and make it difficult to control the vehicle, and if the axle nut fully loosens, the wheel hub will fall off the vehicle, making control even more problematic. Another concern involving axle nuts is that the longitudinal force applied by the nut to the apparatus is typically used to preload the wheel bearings. The preload that is applied to the wheel bearings is required to be within a narrow tolerance to ensure that the bearings rotate properly and do not wear out prematurely. As a result, the torque that is applied to the axle nut must be reliably translated into longitudinal force without the unpredictability of other friction enhancement designs. Another concern is that extreme amounts of torque are applied to axle nuts since a single nut is usually used to fasten the wheel to a vehicle. Thus, the axle nut must be robust and any locking feature must also be sufficiently robust. In other wheel hub applications, the bearings may require a specified end play instead of preload. While this application does not require the higher torque settings that preloaded bearings typically require, precise setting and retention of the end play is still a critical function of the axle nut.

Accordingly, the inventors believe it would be desirable to provide an improved locking fastener.

SUMMARY

A locking fastener is described that can be automatically unlocked when a wrench engages the fastener and is automatically locked when the wrench is removed. The locking fastener includes a spring clip with an arm that extends radially outward along a wrench bearing surface. The arm is biased outward by a torsional section of the spring clip which pushes a pawl against a retainer to lock the fastener. By compressing the arm, the pawl is released from the retainer to unlock the fastener. Additional details and advantages are described below in the detailed description. The invention may include any of the following aspects in various combinations and may also include any other aspect described below in the written description or in the attached drawings.

BRIEF DESCRIPTION OF SEVERAL VIEWS OF THE DRAWINGS

The invention may be more fully understood by reading the following description in conjunction with the drawings, in which.

DETAILED DESCRIPTION

Referring now to the figures, a locking fastener 10 is shown. The locking fastener 10 may including a nut 20, a retainer 30, a pawl 50, and a spring clip 70. The nut 20 is shown by itself in FIGS. 7-8, and in assembly in FIGS. 1-5. The nut 20 includes inner threads 22 that are designed to engage with external threads of a shaft. The nut 20 also includes wrench bearing surfaces 24 that are designed to be engaged by a tool to rotate the nut 20. The nut 20 may be provided with a first torque bearing surface 26 for transferring longitudinal force to the retainer 30 as a result of torque that is applied to the wrench bearing surfaces 24. Preferably, the nut 20 is also provided with a first longitudinal retaining member 28, which may be in the form of an outwardly extending flange 28.

Figure 9:
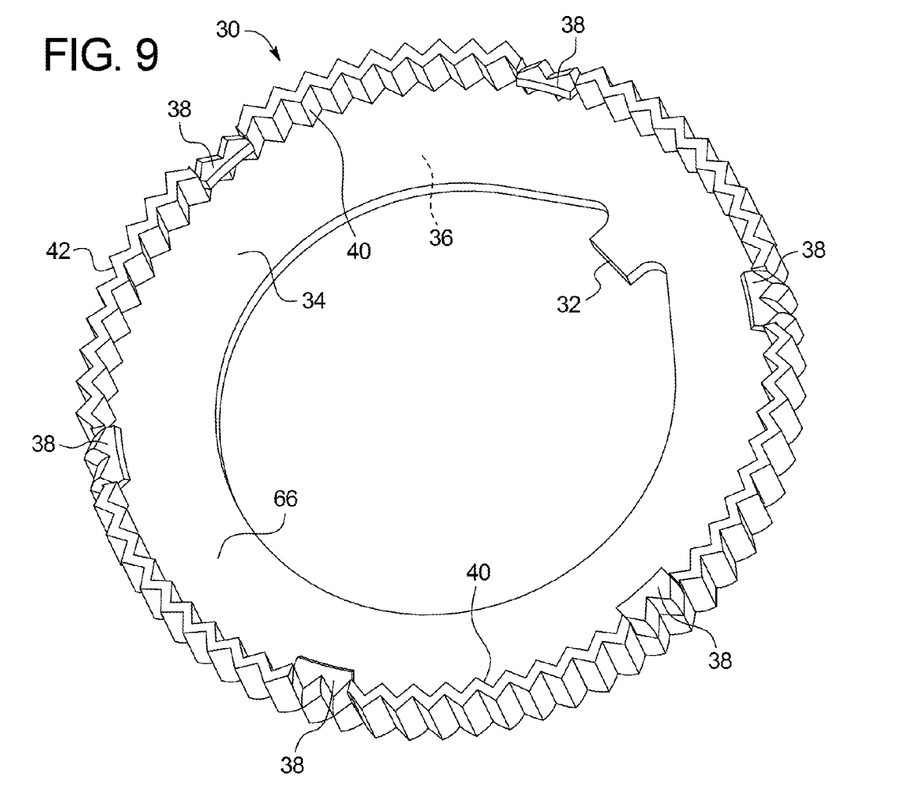
FIG. 9 is a top perspective view of the retainer.

The retainer 30, or retaining ring 30, is shown by itself in FIG. 9, and in assembly in FIGS. 1-4. The retainer 30 includes an inner tab 32, or rotational retaining member 32, that is designed to engage with a slot in the threaded shaft to prevent rotation between the retainer 30 and the shaft. The retainer 30 also includes a second torque bearing surface 34 that receives the longitudinal force from the first torque bearing surface 26 of the nut 20. The retainer 30 also includes a pressure face 36 that is designed to contact an apparatus that the locking fastener 10 is attached to and apply the longitudinal force of the first and second bearing surfaces 26, 34 to the apparatus. Preferably, the retainer 30 is also provided with a second longitudinal retaining member 38, which may be in the form of one or more flanges 38, that extend inward and trap the flange 28 of the nut 20 between the second torque bearing surface 34 and the retainer flanges 38. Thus, the locking fastener 10 may be a unitary fastener 10 where all of the components are fixed together 20.

As shown in FIG. 9, the retainer 30 may have a plurality of ratchet teeth 40 extending around the retainer 30. The ratchet teeth 40 are preferably formed with opposing inclined ramps, and may be shaped with a somewhat more wave-like shape than shown in the figures, since the ratchet teeth 40 may be formed by stamping the ratchet teeth 40 into the surface of the retainer 30. The retainer 30 is preferably made from a plate, which may have a generally uniform thickness, that is stamped to form the desired features of the retainer 30. Because a relatively thin plate will typically be used, the outer surface of the retainer 30 may also follow the shape of the ratchet teeth 40, but in the preferred embodiment described and shown here, the outer surface of the retainer 30 is non-functional. The ratchet teeth 40 are preferably formed along the inner surface of a bent portion 42 of the retainer 30 that is bent in a cup-like fashion 90° from the pressure face 36. Thus, the bent portion 42 extends circumferentially around the nut 20, and the ratchet teeth 40 extend inwardly toward the nut 20. Preferably, the bent portion 42 of the retainer 30 forms the maximum outer circumference of the locking fastener 10, so that the bent portion 42 fully encompasses the entire outer circumference of the nut 20. Thus, as shown FIG. 1, the bent portion 42 of the retainer 30 fully surrounds the flange 28 of the nut 20, and no portion of the nut 20 extends out from the inner surface of the bent portion 42.

Figure 1:
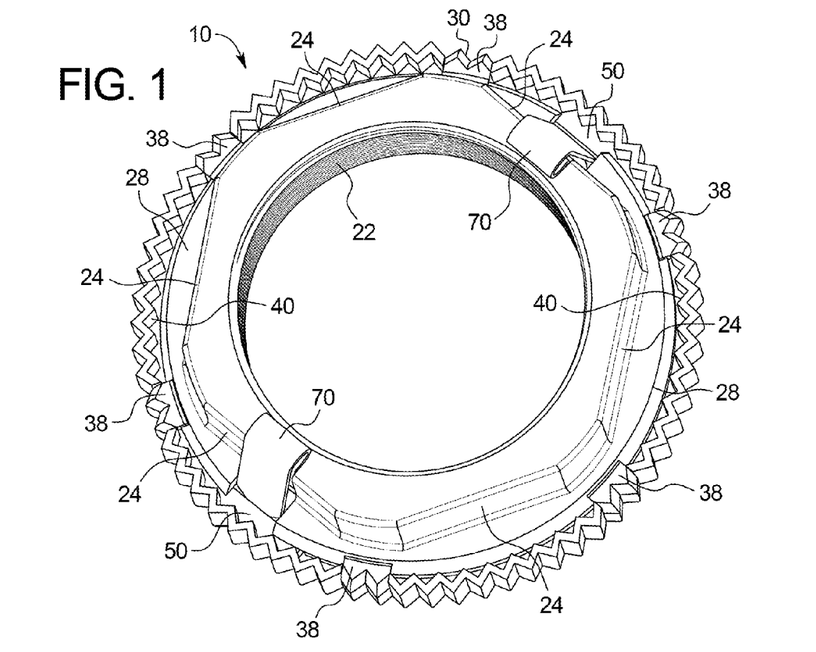
FIG. 1 is a top perspective view of a locking fastener.
Figure 2:
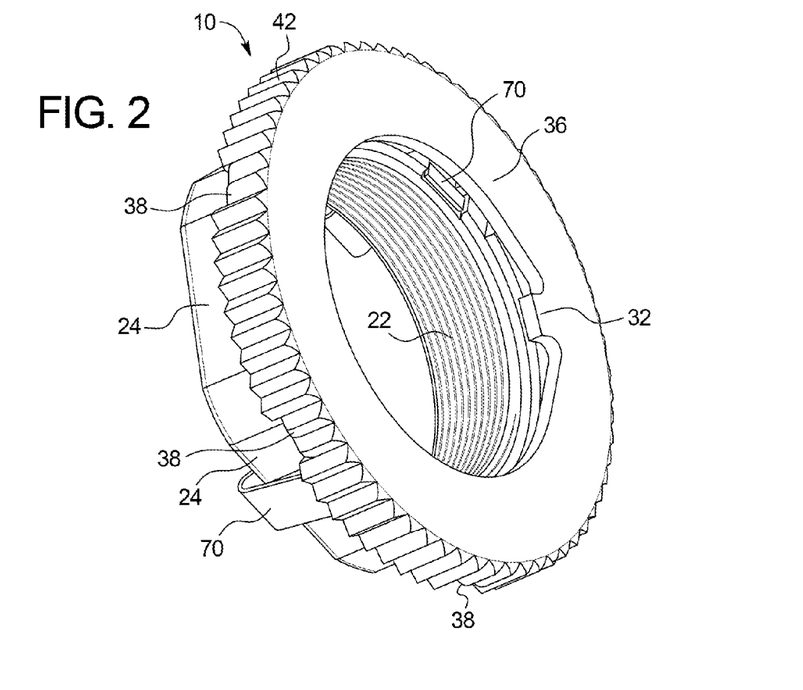
FIG. 2 is a bottom perspective view of the locking fastener.
Figure 3:
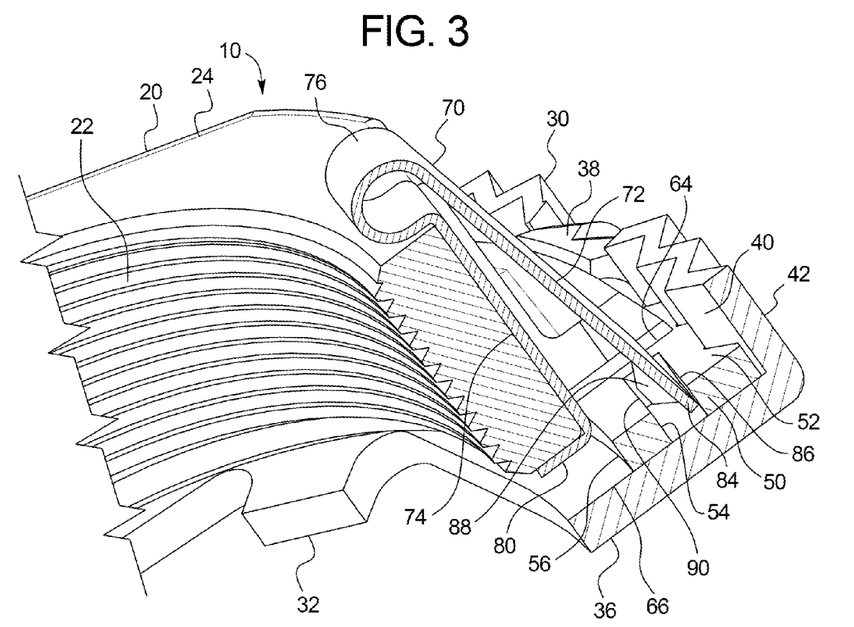
FIG. 3 is a cross-sectional perspective view of the locking fastener.
Figure 4:
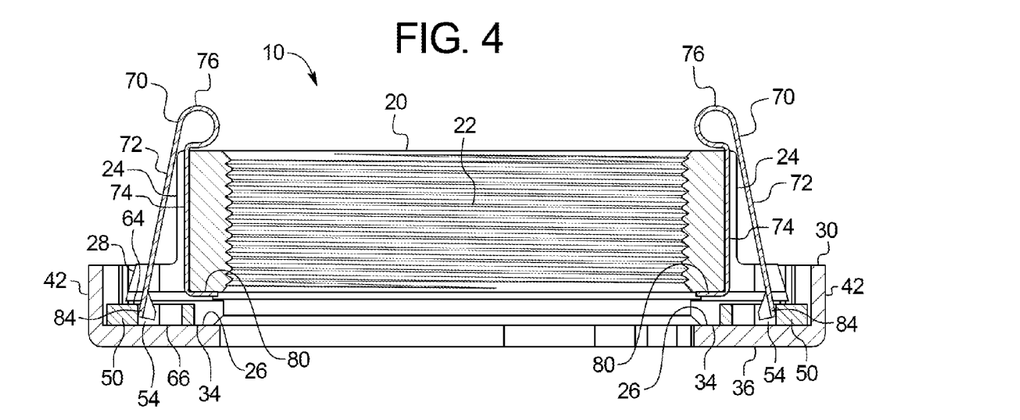
FIG. 4 is a cross-sectional view of the locking fastener.
Figure 5:
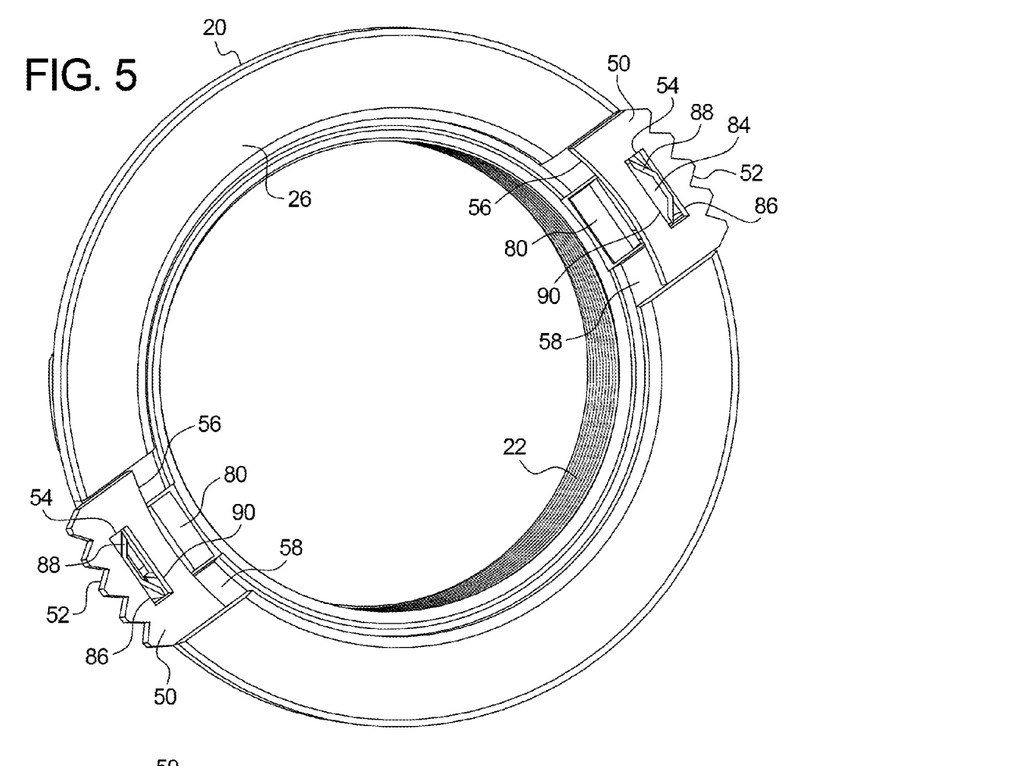
FIG. 5 is a bottom perspective view of the locking fastener without the retainer.
Figure 6:
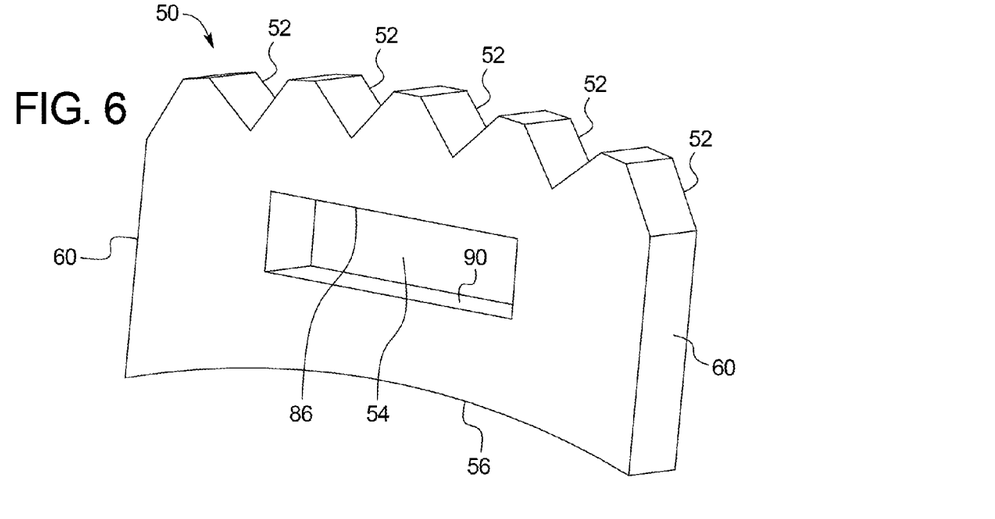
FIG. 6 is a perspective view of the pawl.
Figure 7:
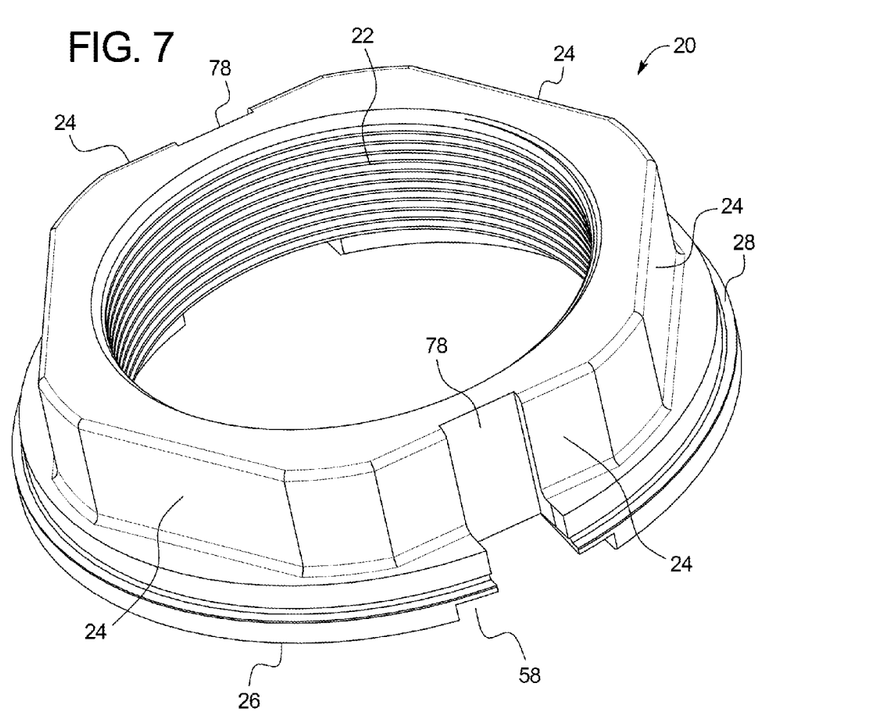
FIG. 7 is a top perspective view of the nut.
Figure 8:
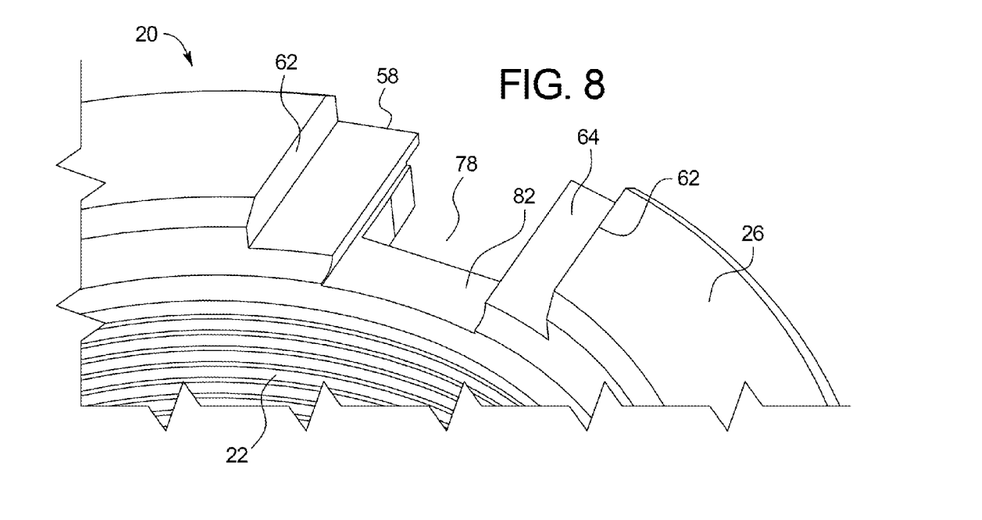
FIG. 8 is an enlarged bottom perspective view of the nut, showing slots for the pawl and the spring clip.

The pawl 50 is shown by itself in FIG. 6, and in assembly in FIGS. 1-5. The pawl 50 includes one or more ratchet teeth 52 along the outer edge of the pawl 50 that engage with the ratchet teeth 40 of the retainer 30. For example, the pawl 50 may have five ratchet teeth 52 if desired. The pawl 50 may have a slot 54 extending through the pawl 50 for engagement with the spring clip 70 as further described below. The inner edge 56 of the pawl 50 is preferably curved along an arc-shape that corresponds to the diameter of the shaft. Like the retainer 30, the pawl 50 may be made as a stamping from a plate, which may have a generally uniform thickness, to minimize manufacturing costs. As shown in FIG. 5, the locking fastener 10 may have multiple pawls 50 located around the circumference of the fastener 10. For example, two pawls 50 may be desirable. As shown in FIGS. 5 and 7-8, the pawls 50 may be located within radial slots 58 extending through the nut 20. The slots 58 may extend through the first torque bearing surface 26 of the nut 20 so that the slots 58 form channels 58 through the bottom of the nut 20. The side surfaces 60 of the pawls 50 preferably contact the side surfaces 62 of the slots 58, so that the nut 20 forces the pawls 50 to rotate with the nut 20 without applying side torque to the spring clips 70. As shown FIG. 4, the pawls 50 may also be located longitudinally between the bottom 64 of the slots 58 and the top 66 of the retainer 30 (i.e., the bottom 66 of the cup-shape of the retainer 30). The spacing between the bottom 64 of the slots 58 and the top 66 of the retainer 30 is preferably larger than the thickness of the pawls 50, so that the pawls 50 are not squeezed between the nut 20 and the retainer 30, and thus, can freely rotate with the nut 20. For example, where the top 66 of the retainer 30 (i.e., the bottom 66 of the cup-shape) is contiguous with the second torque bearing surface 34, the clearance spacing for the pawls 50 may be determined by the depth of the slots 58 in the nut 20 measured from the first torque bearing surface 26 of the nut 20. Where the retainer 30 is cup-shaped with an outer bent wall 42, the pawls 50 may sit in the bottom 66 of the retainer 30 inside the bent portion 42 between the nut 20 and the retainer 30.

Figure 10:
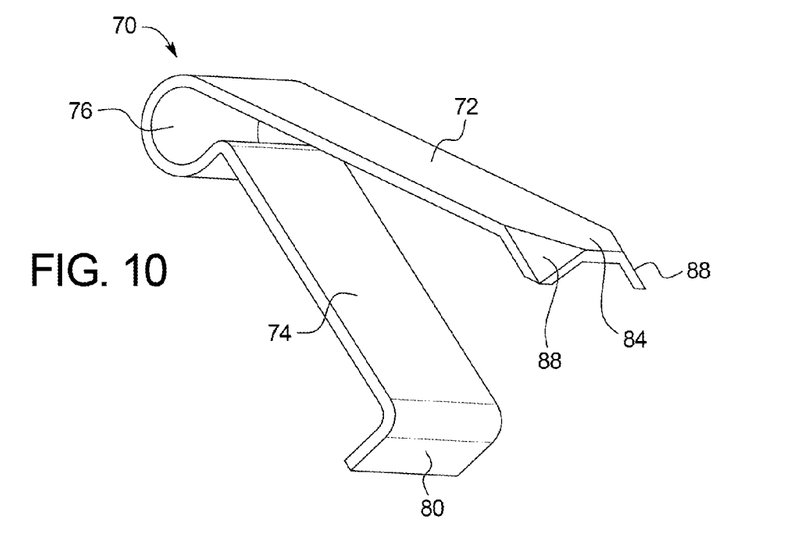
FIG. 10 is a perspective view of the spring clip.

The spring clips 70, or spring 70, is shown by itself in FIG. 10, and in assembly in FIGS. 1-5. The spring clip 70 includes a first arm 72 that is sloped angularly away from one of the wrench bearing surfaces 24. That is, the first arm 72 is located closer to the wrench bearing surface 24 near the top of the nut 20 and farther away from the wrench bearing surface 24 at the bottom of the nut 20. Thus, the first arm 72 extends radially outward as the first arm extends downward along the wrench bearing surface 24. The spring clip 70 may also have a second arm 74 that extends down along the nut 20. The first and second arms 72, 74 may be connected together and biased apart from each other by a torsional spring section 76. The torsional spring section 76 is preferably located above the wrench bearing surfaces 24 and is located inside of the wrench bearing surfaces 24, so that a socket can be slid onto the wrench bearing surfaces 24 without interfering with the torsional spring section 76. The second arm 74 may extend through a longitudinal slot 78 in the nut 20, which may be a channel 78 extending through the wrench bearing surface 24. Thus, the spring clip 70 is rotationally fixed to the nut 20. Preferably, the depth of the slot 78 is deep enough from the wrench bearing surface 24 so that the first and second arms 72, 74 can both fit within the slot 78 when the first arm 72 is compressed by the socket. At the bottom of the second arm 74, a portion 80 of the second arm 74 may extend radially inward through another slot 82 in the bottom of the nut 20. This retains the spring clip 70 longitudinally so that the spring clip 70 is retained to the locking fastener 10. Preferably, the bottom slot 82 for the spring clip 70 is deeper than the slot 58 for the pawl 50, so that the bottom portion 80 of the second arm 74 is above the top surface of the pawl 50. Thus, the pawl 50 may slide radially inward underneath the spring clips 70.

The end 84 of the first arm 72 contacts an inner surface 86 of the pawl 50 to bias the pawl 50 outward away from the wrench bearing surfaces 24 and toward the bent portion 42 of the retainer 30. For example, the end 84 of the first arm 72 may be located within the slot 54 extending through the pawl 50. Thus, in the free state, the end 84 contacts the inwardly facing surface 86 of the slot 54 to push the ratchet teeth 52, 40 of the pawl 50 and the retainer 30 into engagement. However, when a wrenching socket is slid onto the wrench bearing surfaces 24, the socket will compress the first arm 72 toward the wrench bearing surface 24. This allows the engagement of the ratchet teeth 40, 52 to be released while the nut 20 is being tightened or loosened. As shown in FIG. 10, the end 84 of the first arms 72 may also have inwardly facing tabs 88 so that the first arm 72 substantially fills the width of the slot 54 in the pawl 50. Thus, when the first arm 72 is compressed by the socket, the tabs 88 will contact the outwardly facing surface 90 of the slot 54 to pull the pawl 50 away from the retainer 30 and the retainer teeth 40.

The ratchet teeth 40, 52 of the retainer 30 and the pawl 50 may be designed to achieve the specific level of locking retention that is desired in a particular application. For example, the ratchet teeth 40, 52 of the retainer 30 and the pawl 50 may be shaped symmetrically, so that the ratchet teeth 40, 52 provide generally equal resistance to relative rotation in the loosening and tightening directions. Alternatively, the ratchet teeth 52 of the pawl 50 or the ratchet teeth 40 of the retainer 30 may be shaped asymmetrically, so that the ratchet teeth 40, 52 provide more resistance to relative rotation in the loosening direction than the tightening direction. For example, the inclined ramps of the teeth 40, 52 may be steeper in the loosening direction than in the tightening direction. It may also be desirable for the resistance in the loosening direction to be three times the resistance in the tightening direction.

While the ratchet teeth 40, 52 may be designed to completely lock the fastener 10 so that no amount of force can turn the nut 20 without breaking one or more components of the fastener 10, the ratchet teeth 40, 52 are preferably designed to allow the ratchet teeth 40, 52 to ride over each other even when a wrenching socket does not completely compress the first arms 72 if sufficient torque is applied to the nut 20. In most cases, the locking fastener 10 will be used with a conventional socket that is slid onto the wrench bearing surfaces 24. As the socket is slid onto the nut 20, the end of the socket contacts the first arms 72 of the spring clips 70, and the spring clips 70 are compressed inside of the socket against the nut 20. This causes the spring clips 70 to release the outward bias against the pawls 50, and thus, the engagement between the ratchet teeth 52, 40 of the pawls 50 and the retainer 30. As a result, the nut 20 (and pawls 50 and spring clips 70) freely rotates relative to the retainer 30 (which is fixed to the threaded shaft). Once the locking fastener 10 has been fully tightened, the socket is removed, and the first arms 72 of the spring clips 70 push the pawls 50 outward to engage the ratchet teeth 40, 52 together. As a result, the nut fastener 10 is positively locked to prevent relative rotation between the nut 20 and the retainer 30. However, in some cases, the preferred method of use may not be strictly followed for a variety of reasons. For example, the socket may not be slid all the way to the bottom of the wrench bearing surfaces 24, or an oversized socket may be used. It is also possible that a non-socket wrench, like an open-ended wrench could be used, that does not contact one or more of the spring clips 70. In these cases, the first arms 72 of one or more spring clips 70 may be only partially compressed or may not be compressed at all. However, due to the design of the locking fastener 10, the ratchet teeth 40, 52 may be shaped to ride over each other even when the ratchet teeth 40, 50 remain engaged with each other. Thus, the ratchet teeth 40, 52 preferably ride over each other before any of the components of the locking fastener 10 are broken. Once the socket is released from the first arms 72 of the spring clips 70, the spring clips 70 will operate in the expected fashion by biasing the pawls 50 outward against the retainer 30 to lock the fastener 10 without any unseen damage occurring to the fastener 10 or unknown reduction in locking functioning existing. In addition, in most cases, there will be at least some amount of release in the bias of the pawls 50 against the retainer 30, since the socket will usually at least partially compress the first arms 72. Thus, even if the ratchet teeth 52, 40 of the pawls 50 and retainer 30 are not fully disengaged from each other, the ratchet teeth 40, 52 will usually be at least partially disengaged by the socket, and the locking resistance will be at least partially reduced during tightening and loosening of the locking fastener 10. Because the ratchet teeth 40, 52 are designed to ride over each other, even a partial disengagement of the ratchet teeth 40, 52 will be desirable during tightening and loosening since partial engagement of the ratchet teeth 40, 52 will not result in breaking any of the components of the locking fastener 10.

Another embodiment of the locking fastener 100 is shown in FIGS. 11-16. For conciseness, features of the locking fastener 10 that have been described above are not repeated below, since one of ordinary skill in the art will understand that the principles described above could be used with different types of locking fasteners including the locking fastener 100 of FIGS. 11-16. As illustrated in FIGS. 11-14, one variation of the locking fastener 100 compared to the locking fastener 10 described above is that the longitudinal retaining member 102 is a retaining clip 102 that snaps into a groove 104 in the retainer 30. Like the flanges 38 shown in FIG. 9, the retaining clip 102 traps the flange 28 of the nut 20 between the second torque bearing surface 34 and the retaining clip 102. Thus, the locking fastener 100 may be a unitary fastener 100 after the components are assembled and the retaining clip 102 is installed in the groove 104 of the retainer 30. However, unlike the flanges 38, the retaining clip 102 may be removed from the groove 104 after assembly in order to allow the locking fastener 100 to be disassembled. For example, the retaining clip 102 may be provided with an outer recessed portion 106 at one end 108 to allow a tool to grasp the end 108 to pull the clip 102 out of the groove 104. Preferably, the retaining clip 102 is made of spring metal to allow the clip 102 to be partially compressed to install it into the retainer 30 and to allow the clip 102 to spring outward into the groove 104. The use of the retaining clip 102 allows the locking fastener 100 to be rebuilt after extended use or may allow detailed inspections to be performed of individual components as desired. It may also make initial assembly of the locking fastener 100 easier since a special tool is not needed to bend the flanges 38 inward after the individual components have been assembled.

Figure 11:
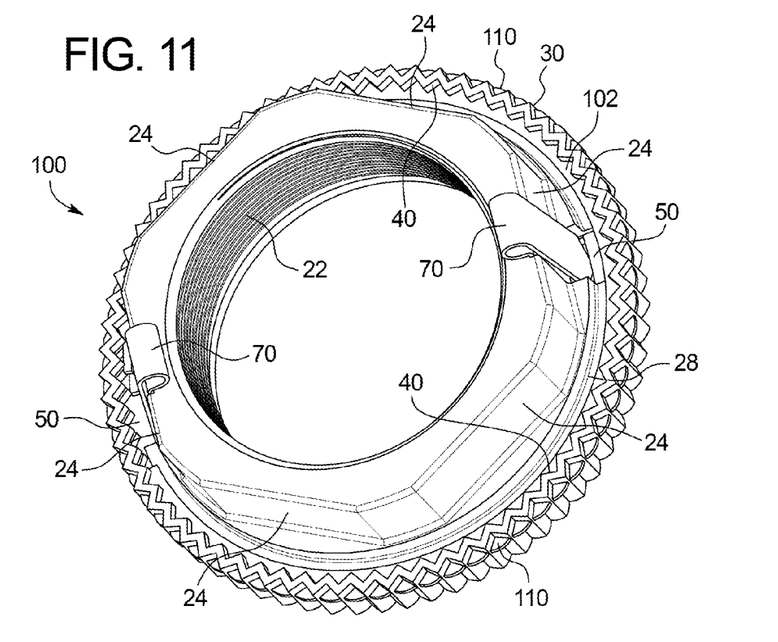
FIG. 11 is a perspective view of another locking fastener.
Figure 13:
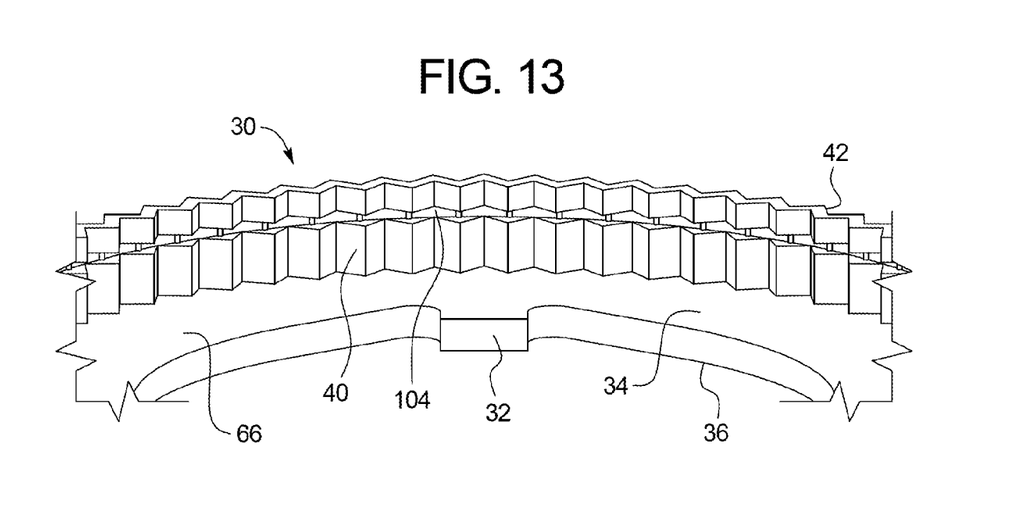
FIG. 13 is an inside perspective view of the retainer.
Figure 14:
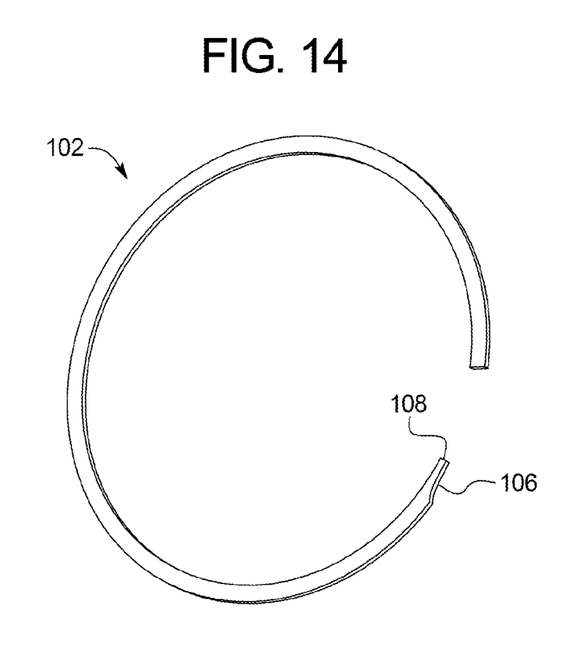
FIG. 14 is a perspective view of the retaining clip.
Figure 15:
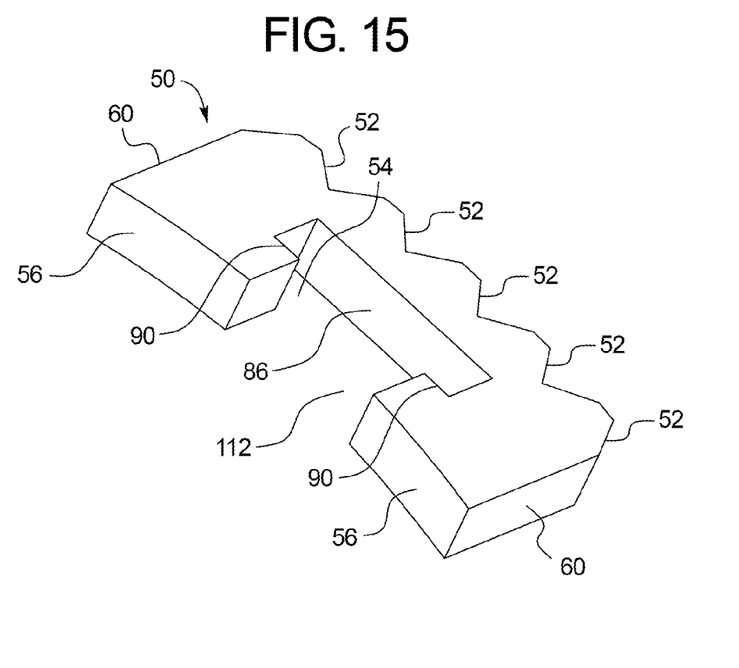
FIG. 15 is a perspective view of the pawl.
Figure 16:
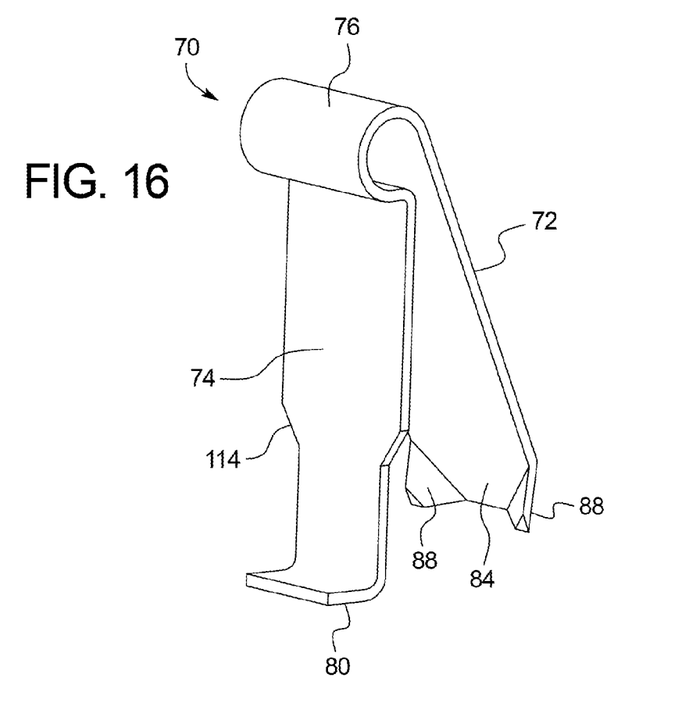
FIG. 16 is a perspective view of the spring clip.

While the groove 104 may be cut into the inner surface of the bent portion 42 of the retainer 30 and into the ratchet teeth 40 along the inner surface, it is preferable for the groove 104 to be formed into the inner surface by pressing the material of the wall 42 outward to form the groove 104 as illustrated in FIG. 13. As shown in FIG. 11, this design would result in a rib 110 being formed on the outside of the wall 42 within at least the spaces formed by the ratchet teeth 40. In addition to the possible reduction in manufacturing cost to make the groove 104 compared to cutting the groove 104 into the wall 42, another advantage is that the portion of the wall 42 above the groove 104 remains fully connected to the bottom portion of the wall 42 and is not separated with partial slots that would occur if material from the teeth 40 were removed by cutting the groove 104 into the teeth 40.

Figure 12:
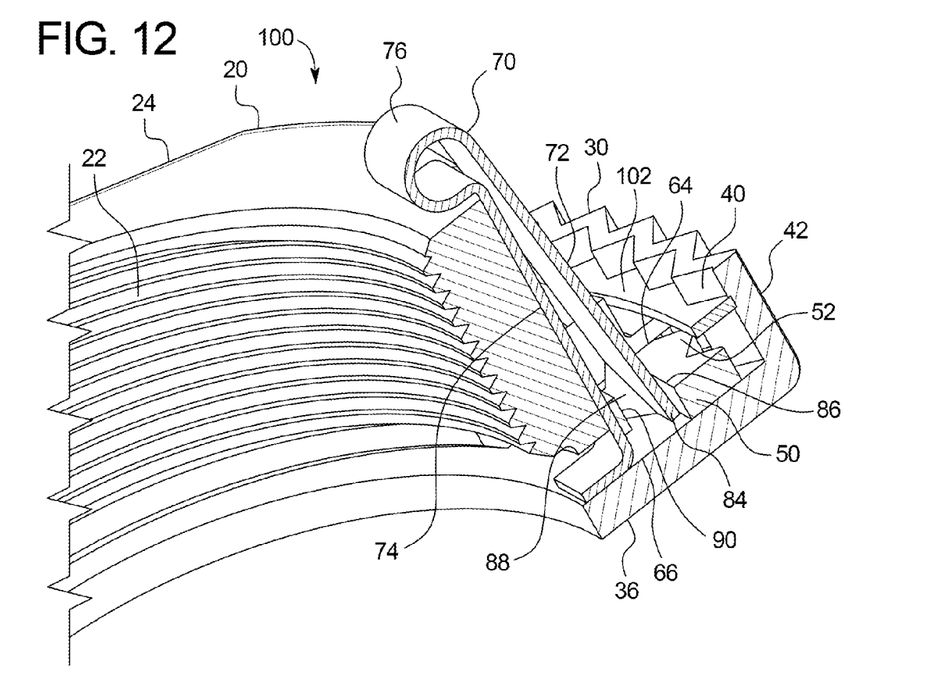
FIG. 12 is a cross-sectional perspective view of the locking fastener.

As shown in FIG. 12, another variation of the locking fastener 100 is that the bottom portion 80 of the second arm 74 of the spring clips 70 is positioned so that it rests on the top 66 of the retainer 30. This may make it easier to assemble the locking fastener 100. In addition, this design may provide better control over the vertical position of the end 84 of the first arm 72 in the slot 54 of the pawl 50. That is, since the bottom 80 of the second arm 74 rests on the top 66 of the retainer 30, the position of the end 84 of the first arm 72 is fixed relative to the top 66 of the retainer 30. Thus, only manufacturing tolerances in the manufacturing of the spring clip 70 itself will affect the vertical position of the end 84 of the first arm 72 in the slot 54 of the pawl 50.

However, because the bottom portion 80 of the second arm 74 extends downward to the top 66 of the retainer 30, the second arm 74 would interfere, in the design of FIGS. 1-10, with the pawl 50 as the pawl 50 moves inward during ratcheting. In order to overcome this problem, the pawl 50 has been provided with a second slot 112 that extends between the first slot 54 and the inner edge 56 of the pawl 50. Thus, as the pawl 50 moves inward during ratcheting, the second slot 112 provides clearance around the bottom 80 of the second arm 74 so that the second slot 112 (and the pawl 50) can move inward around the bottom 80 of the second arm 74 without interfering. Another problem, however, is that the tabs 88 of the spring clip 70 are intended to contact the outwardly facing surface 90 of the first slot 54 when a wrenching socket is slid onto the nut 20 in order to pull the pawl 50 away from the retainer teeth 40. In order to preserve this function, the second slot 112 is preferably smaller in width than the first slot 54. Thus, the outwardly facing surface 90 may be two surfaces 90 on each side of the first slot 54, where the shorter width of the second slot 112 defines the size and position of the outwardly facing surfaces 90. Because the tabs 88 of the spring clips 70 are positioned at the sides, or corners, of the first arms 72, the tabs 88 will be able to remain in contact with outwardly facing edge surfaces 90 to pull the pawl 50 inward as described above. It is also desirable in this design for the bottom portion 80 of the second arm 74 of the spring clip 70 to be smaller in width than the end 84 of the first arm 72. This allows the bottom portion 80 of the second arm 74 to slide through the second slot 112 while allowing the tabs 88 of the first arm 72 to engage the outwardly facing edge surfaces 90 of the first slot 54. Thus, the second arm 74 may be provided with a transition 114 in width above the bottom portion 80.

While preferred embodiments of the invention have been described, it should be understood that the invention is not so limited, and modifications may be made without departing from the invention. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A locking fastener, comprising:
   a nut comprising inner threads engageable with external threads on a shaft, a plurality of wrench bearing surfaces engageable with a tool to rotate said nut, and a first torque bearing surface;
   a retaining ring comprising a rotational retaining member engageable with said shaft thereby preventing relative rotation between said retaining ring and said shaft, a second torque bearing surface engaged with said first torque bearing surface thereby translating longitudinal force from said nut to said retaining ring, a pressure surface adapted to apply said longitudinal force to an apparatus, and a plurality of ratchet teeth extending around said retaining ring;
   a pawl comprising a ratchet tooth engaged with said ratchet teeth of said retaining ring; and
   a spring disposed between one of said wrench bearing surfaces of said nut and said pawl, said spring comprising a first arm extending radially outward as said first arm extends downward along said wrench bearing surface, said first arm being biased away from said wrench bearing surface and being compressible toward said wrench bearing surface by said tool, a portion of said first arm biasing said pawl outward against said retaining ring and compression of said first arm by said tool thereby releasing engagement between said ratchet tooth of said pawl from said ratchet teeth of said retaining ring.

2. The locking fastener according to claim 1, wherein said spring further comprises a second arm extending downward along said nut, said first and second arms being biased apart from each other by a torsional section between said first and second arms.

3. The locking fastener according to claim 2, wherein said torsional section is disposed above said wrench bearing surface and inside of said wrench bearing surface.

4. The locking fastener according to claim 2, wherein said second arm of said spring is disposed within a slot extending through said nut, said spring thereby being rotationally fixed to said nut.

5. The locking fastener according to claim 1, wherein said pawl is disposed within a slot extending through said nut, side surfaces of said pawl contacting side surfaces of said nut such that said pawl rotates with said nut.

6. The locking fastener according to claim 1, wherein said pawl is disposed longitudinally between a bottom surface of said nut and a top surface of said retaining ring, a spacing between said bottom surface and said top surface being larger than a thickness of said pawl.

7. The locking fastener according to claim 1, wherein said nut comprises a first longitudinal retaining member and said retaining ring comprises a second longitudinal retaining member engaged with said first longitudinal retaining member thereby preventing said nut and said retaining ring from separating from each other.

8. The locking fastener according to claim 7, wherein said retaining ring comprises a bent portion extending around a portion of said nut, said ratchet teeth being disposed along an inner surface of said bent portion and said pawl being disposed inside of said bent portion, said second longitudinal retaining member comprising a retaining clip disposed within a groove in said inner surface of said bent portion.

9. The locking fastener according to claim 1, wherein said retaining ring comprises a bent portion extending around a portion of said nut, said ratchet teeth being disposed along an inner surface of said bent portion and said pawl being disposed inside of said bent portion.

10. The locking fastener according to claim 9, wherein said inner surface of said bent portion encompasses an entire outer circumference of said nut, wherein no portion of said nut extends out from said inner surface of said bent portion.

11. The locking fastener according to claim 9, wherein said retaining ring is a stamping from a plate.

12. The locking fastener according to claim 1, wherein said ratchet tooth of said pawl and said ratchet teeth of said retaining ring are shaped to allow said ratchet tooth to ride over said ratchet teeth with sufficient torque when said tool does not compress said first arm.

13. The locking fastener according to claim 1, wherein said ratchet tooth of said pawl and said ratchet teeth of said retaining ring are symmetrically shaped, said ratchet tooth and said ratchet teeth thereby providing generally equal resistance to relative rotation in a loosening direction and a tightening direction.

14. The locking fastener according to claim 1, wherein said ratchet tooth of said pawl or said ratchet teeth of said retaining ring are asymmetrically shaped, said ratchet tooth and said ratchet teeth thereby providing greater resistance to relative rotation in a loosening direction than a tightening direction.

15. The locking fastener according to claim 14, wherein said resistance between said ratchet tooth and said ratchet teeth in said loosening direction is at least three times said resistance in said tightening direction.

16. A locking fastener, comprising:
a nut comprising inner threads engageable with external threads on a shaft, a plurality of wrench bearing surfaces engageable with a tool to rotate said nut, and a first torque bearing surface;
a retaining ring comprising a rotational retaining member engageable with said shaft thereby preventing relative rotation between said retaining ring and said shaft, a second torque bearing surface engaged with said first torque bearing surface thereby translating longitudinal force from said nut to said retaining ring, a pressure surface adapted to apply said longitudinal force to an apparatus, and a plurality of ratchet teeth extending around said retaining ring;
a pawl comprising a ratchet tooth engaged with said ratchet teeth of said retaining ring; and
a spring disposed between one of said wrench bearing surfaces of said nut and said pawl, said spring comprising a first arm extending radially outward as said first arm extends downward along said wrench bearing surface, said first arm being biased away from said wrench bearing surface and being compressible toward said wrench bearing surface by said tool, a portion of said first arm biasing said pawl outward against said retaining ring and compression of said first arm by said tool thereby releasing engagement between said ratchet tooth of said pawl from said ratchet teeth of said retaining ring;
wherein said portion of said first arm biasing said pawl outward against said retaining ring comprises an end of said first arm contacting an inner surface of said pawl.

17. The locking fastener according to claim 16, wherein said inner surface of said pawl is an inwardly facing surface of a slot extending through said pawl, said slot further comprising an outwardly facing surface, and said end of said first arm contacting said outwardly facing surface when said first arm is compressed by said tool thereby pulling said pawl away from said retaining ring.

18. The locking fastener according to claim 17, wherein said spring further comprises a second arm extending downward along said nut, said first and second arms being biased apart from each other by a torsional section between said first and second arms, a bottom portion of said second arm contacting a top surface of said retaining ring, said pawl comprising another slot extending between said slot and an inner edge of said pawl, said another slot being smaller in width than said slot, said outwardly facing surface comprising one outwardly facing surface on each side of said another slot, said bottom portion of said second arm being smaller in width than said end of said first arm, and said another slot moving around said bottom portion of said second arm when said ratchet tooth of said pawl is released from engagement with said ratchet teeth of said retaining ring.

19. A locking fastener, comprising:
a nut comprising inner threads engageable with external threads on a shaft, a plurality of wrench bearing surfaces engageable with a tool to rotate said nut, and a first torque bearing surface;
a retaining ring comprising a rotational retaining member engageable with said shaft thereby preventing relative rotation between said retaining ring and said shaft, a second torque bearing surface engaged with said first torque bearing surface thereby translating longitudinal force from said nut to said retaining ring, a pressure surface adapted to apply said longitudinal force to an apparatus, and a plurality of ratchet teeth extending around said retaining ring;
a pawl comprising a ratchet tooth engaged with said ratchet teeth of said retaining ring; and
a spring disposed between one of said wrench bearing surfaces of said nut and said pawl, said spring comprising a first arm extending radially outward as said first arm extends downward along said wrench bearing surface, said first arm being biased away from said wrench bearing surface and being compressible toward said wrench bearing surface by said tool, a portion of said first arm biasing said pawl outward against said retaining ring and compression of said first arm by said tool thereby releasing engagement between said ratchet tooth of said pawl from said ratchet teeth of said retaining ring;

wherein said spring further comprises a second arm extending downward along said nut, said first and second arms being biased apart from each other by a torsional section between said first and second arms, said second arm of said spring is disposed within a slot extending through said nut, said spring thereby being rotationally fixed to said nut, said pawl is disposed within a slot extending through said nut, side surfaces of said pawl contacting side surfaces of said nut such that said pawl rotates with said nut, said pawl is disposed longitudinally between a bottom surface of said nut and a top surface of said retaining ring, a spacing between said bottom surface and said top surface being larger than a thickness of said pawl, and said ratchet tooth of said pawl and said ratchet teeth of said retaining ring are shaped to allow said ratchet tooth to ride over said ratchet teeth with sufficient torque when said tool does not compress said first arm.

20. The locking fastener according to claim 19, wherein said torsional section is disposed above said wrench bearing surface and inside of said wrench bearing surface, said portion of said first arm biasing said pawl outward against said retaining ring comprises an end of said first arm contacting an inner surface of said pawl, and said nut comprises a first longitudinal retaining member and said retaining ring comprises a second longitudinal retaining member engaged with said first longitudinal retaining member thereby preventing said nut and said retaining ring from separating from each other.

21. The locking fastener according to claim 20, wherein said retaining ring comprises a bent portion extending around a portion of said nut, said ratchet teeth being disposed along an inner surface of said bent portion and said pawl being disposed inside of said bent portion, said inner surface of said bent portion encompasses an entire outer circumference of said nut, wherein no portion of said nut extends out from said inner surface of said bent portion, and said retaining ring is a stamping from a plate.

22. The locking fastener according to claim 21, wherein said inner surface of said pawl is an inwardly facing surface of a slot extending through said pawl, said slot further comprising an outwardly facing surface, and said end of said first arm contacting said outwardly facing surface when said first arm is compressed by said tool thereby pulling said pawl away from said retaining ring.

* * * * *